US009679343B2

(12) United States Patent
Yurdana et al.

(10) Patent No.: US 9,679,343 B2
(45) Date of Patent: Jun. 13, 2017

(54) SYSTEM AND METHOD FOR PERSONAL BROADCAST (71) Applicant: Intel Corporation, Santa Clara, CA (US)

(72) Inventors: Matt A. Yurdana, Portland, OR (US); Rita H Wouhaybi, Portland, OR (US); Ryan Scott Brotman, Beaverton, OR (US); Susan Alice Faulkner, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/991,589

(22) PCT Filed: Mar. 14, 2013

(86) PCT No.: PCT/US2013/031247
§ 371 (c)(1),
(2) Date: Jun. 4, 2013

(87) PCT Pub. No.: WO2014/142863
PCT Pub. Date: Sep. 18, 2014

(65) Prior Publication Data
US 2015/0170314 A1    Jun. 18, 2015

(51) Int. Cl.
*H04N 21/414*     (2011.01)
*H04N 21/4788*    (2011.01)
(Continued)

(52) U.S. Cl.
CPC ......... *G06T 1/20* (2013.01); *H04N 21/41407* (2013.01); *H04N 21/4524* (2013.01); *H04N 21/4788* (2013.01)

(58) Field of Classification Search
None
See application file for complete search history.

(56) References Cited

U.S. PATENT DOCUMENTS

| 8,509,814 B1 * | 8/2013 | Parker | H04M 3/42 455/414.2 |
| 2001/0014870 A1 * | 8/2001 | Saito | G06Q 20/204 705/14.26 |

(Continued)

FOREIGN PATENT DOCUMENTS

| CN | 104995922 A | 10/2015 |
| JP | 3116392 U | 12/2005 |

(Continued)

OTHER PUBLICATIONS

"International Application Serial No. PCT/US2013/031247, International Preliminary Report on Patentability mailed Sep. 24, 2015", 10 pgs.

(Continued)

*Primary Examiner* — Joni Richer
(74) *Attorney, Agent, or Firm* — Schwegman Lundberg & Woessner, P.A.

(57) ABSTRACT

Embodiments for providing personal broadcast are generally described herein. A computing device to display a personal bulletin board may comprise a transceiver configured to data at the computing device from a second computing device; a rear-facing screen configured to present an indication of the data to a user of the first computing device; an input module configured to receive a command from the user to display a representation of the data on the front-facing screen; and a front-facing screen configured to display the representation of the data in response to receiving the command from the user.

25 Claims, 4 Drawing Sheets

(51) Int. Cl.
*G06T 1/20* (2006.01)
*H04N 21/45* (2011.01)

(56) References Cited

U.S. PATENT DOCUMENTS

| | | |
|---|---|---|
| 2002/0032037 A1 | 3/2002 | Segawa |
| 2005/0131837 A1* | 6/2005 | Sanctis .................. G06Q 20/12 |
| | | 705/64 |
| 2008/0183582 A1* | 7/2008 | Major ................ G06Q 30/0277 |
| | | 705/14.73 |
| 2009/0292799 A1 | 11/2009 | Eisener et al. |
| 2011/0314168 A1 | 12/2011 | Bathiche et al. |
| 2012/0122425 A1 | 5/2012 | Adams et al. |
| 2012/0197726 A1* | 8/2012 | Aggarwal .............. G06Q 30/02 |
| | | 705/14.64 |
| 2012/0297466 A1* | 11/2012 | Li ........................... G06F 21/10 |
| | | 726/7 |
| 2013/0117106 A1* | 5/2013 | Glassman .......... G06Q 30/0255 |
| | | 705/14.53 |
| 2013/0169545 A1* | 7/2013 | Eaton ...................... G06F 3/041 |
| | | 345/173 |
| 2013/0217330 A1* | 8/2013 | Gardenfors ......... H04M 1/7253 |
| | | 455/41.2 |
| 2014/0007150 A1* | 1/2014 | Bhide .................. H04N 21/454 |
| | | 725/14 |
| 2014/0089135 A1* | 3/2014 | Linh .................. G06Q 30/0601 |
| | | 705/26.7 |
| 2014/0113550 A1* | 4/2014 | Li .......................... H04L 67/06 |
| | | 455/41.1 |

FOREIGN PATENT DOCUMENTS

| | | |
|---|---|---|
| KR | 1020110138846 A | 12/2011 |
| WO | WO-2009037588 A2 | 3/2009 |
| WO | WO-2012044770 A2 | 4/2012 |
| WO | WO-2012166739 A2 | 12/2012 |
| WO | WO-2014142863 A1 | 9/2014 |
| WO | WO-2014142863 A8 | 9/2014 |

OTHER PUBLICATIONS

"International Application Serial No. PCT/US2013/031247, International Search Report mailed Dec. 11, 2013", 3 pgs.

"International Application Serial No. PCT/US2013/031247, Written Opinion mailed Dec. 11, 2013", 8 pgs.

"Chinese Application Serial No. 201380073054.4, Voluntary Amendment filed Nov. 19, 2015", w/English Claims, 17 pgs.

"European Application Serial No. 13877683.6, Extended European Search Report mailed Feb. 1, 2017", 12 pgs.

* cited by examiner

SYSTEM AND METHOD FOR PERSONAL BROADCAST

PRIORITY APPLICATION

This application is a U.S. National Stage Application under 35 U.S.C. 371 from International Application No. PCT/US2013/031247, filed Mar. 14, 2013, which is hereby incorporated by reference in its entirety.

TECHNICAL FIELD

Embodiments described herein generally relate to broadcasting information.

BACKGROUND

In many ways, a computer is an expression of a person's values, beliefs, and interests. The choice of color, form, and brand allow a person to exhibit such expressions.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiment.

Although a person may exhibit self-expression through the use of computer form, color, and brand, what is needed are additional ways for a person to express his or her beliefs, interests, and values. What is needed is a way for a person to broadcast such information to a proximate audience.

In some examples, a dual-screen portable computer is described. The dual-screen portable computer may be in the form of a convertible notebook computer. A convertible notebook computer, also known as a convertible laptop, notepad, Ultrabook®, or tablet/laptop hybrid, is a computer that is in the form of a typical clamshell design. A convertible notebook computer includes a keyboard on the lower portion of the clamshell (e.g., "base") and two screens on the upper portion (e.g., "lid"), one on each side of the lid. For the purposes of the discussion herein, the screen on the inside of the clamshell (the conventional screen position) is called the rear-facing or back-facing screen. The screen on the outside of the clamshell is called the front-facing or forward-facing screen. The screen positions are named in reference to the user's point-of-view. When in a closed position, the convertible notebook computer may act as a tablet computer where the front-facing screen acts as both the input mechanism (e.g., touchscreen) and the output mechanism (e.g., display). When in an open position, the convertible notebook may act as a conventional notebook computer, with a keyboard and touchpad input and the main user interface displayed on the rear-facing screen, which may optionally be a touchscreen. In the open position, the front-facing screen is not easily usable by the primary user. However, in embodiments described herein, the front-facing screen is used to present a personal bulletin board. While certain input mechanisms (e.g., a keyboard and track pad) are be described on the base, it is understood that other input mechanism may exist in addition to or in place of these mechanisms, including but not limited to a touchscreen interface. The touchscreen interface may be used to provide an electronic keyboard and other input controls.

Figure 1:
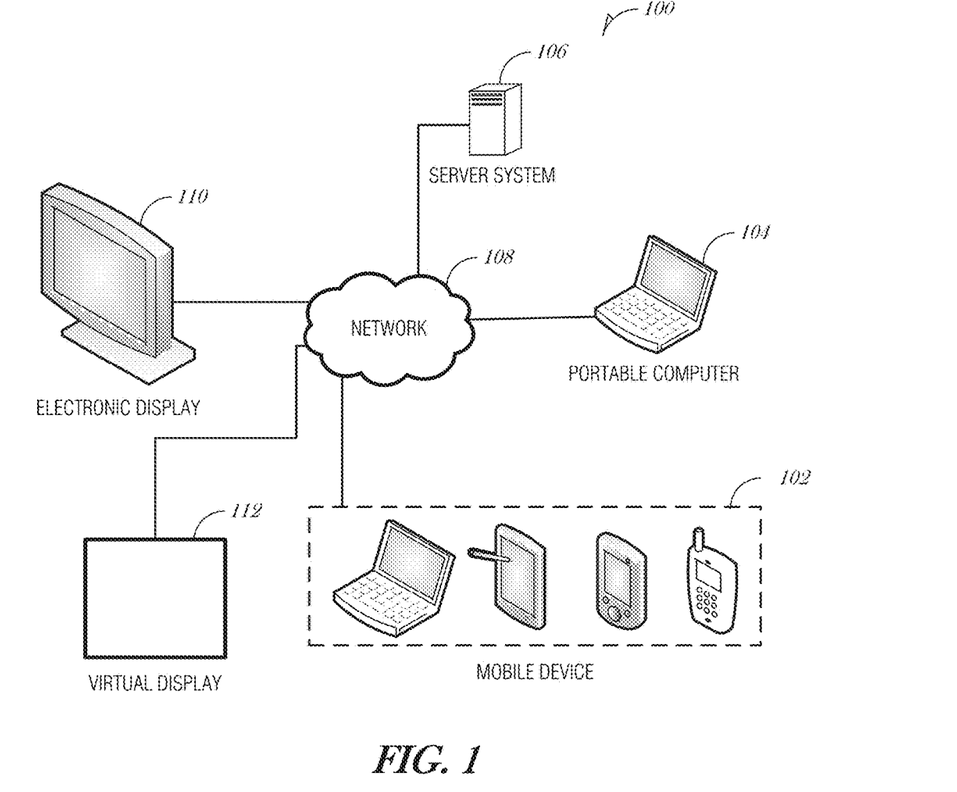
FIG. 1 is a schematic diagram illustrating a system for sharing information, according to an embodiment.

Turning to the figures, FIG. 1 is a schematic diagram illustrating a system 100 for sharing information, according to an example embodiment. FIG. 1 includes a mobile device 102, a portable computer 104, and a server system 106, interconnected via a network 108. While the server system 106 is illustrated as a single machine in FIG. 1, in various embodiments, the server system 106 may comprise multiple servers working together (e.g., colocated, distributed, or as a cloud-based system).

The mobile device 102 includes devices such as a smartphone, cellular telephone, mobile phone, laptop computer, tablet computer, Ultrabook®, or other portable networked device. In general, the mobile device 102 is small and light enough to be considered portable (e.g., carried by a person) and includes a mechanism to connect to the network 108, either over a persistent or intermittent connection. The mobile device 102 may include a proximity module. The proximity module 102 may periodically, continuously, or regularly obtain a user's location. In an embodiment, the user's location is determined with technologies such as global positioning system (GPS), radio frequency triangulation, or other location aware services. The proximity module may communicate with a server (e.g., a cloud-based service) to obtain the location of the mobile device 102. The mobile device 102 may be capable of transmitting and receiving wireless signals using various technologies. Examples of wireless technologies include, but are not limited to Bluetooth™, Wi-Fi®, cellular, radio-frequency identification (RFID), WiMAX®, and the like.

The portable computer 104 may be equipped similar to the mobile device 102 in that it may include network capabilities, location aware technology, and a user interface to receive information from a user and provide information to a user. Another feature that the portable computer 104 includes is the use of two screens. For example, in the example of a laptop with a hinged body (e.g., a clamshell design), on each side of the lid is a screen. In some embodiments, a screen may not occupy the entire side of the lid. For example, a 13" laptop may include a screen that takes up substantially the entire planar surface on the rear-facing side, and a smaller screen that only takes up a quarter of the planar surface on the front-facing side. Alternatively, a mobile smartphone may include two screens, each of which take up substantially the entire surface on each surface. Other embodiments that use dual-screen configurations are understood to be incorporated into this disclosure and referred to as the mobile device 102.

Figure 1A:
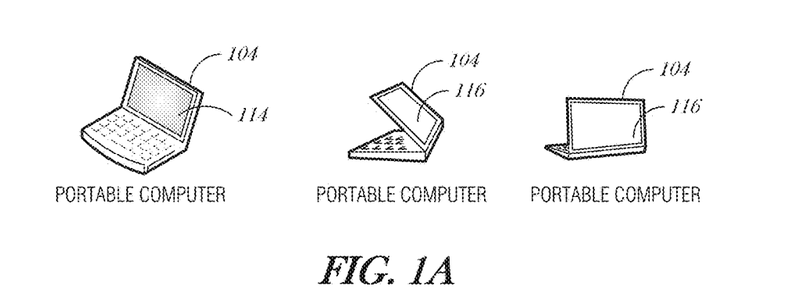
FIG. 1A is a diagram illustrating different views of a portable computer, according to an embodiment.

FIG. 1A is a diagram illustrating different views of a portable computer 104, according to an embodiment. As shown in FIG. 1A, the portable computer 104 may include a rear-facing screen 114 facing the user (e.g. on the inside of the clamshell enclosure) and a front-facing screen 116 facing away from the user.

Returning to FIG. 1, the server system 106 may be associated with, hosted by, or otherwise related to a business, a place of business (e.g., coffee shop), or a public area (e.g., library, school, or airport).

In operation, a user at the portable computer 104 may present content on a front-facing screen. The content may include images, messages, video, or other multimedia content. The presentation, being faced outward from the user, acts as a broadcast. Other users may view the presentation and share in the experience by taking some or all of the presentation and storing it to their device, in an operation referred to as "peeling." Users may also share in the experience by placing content on the portable computer 104 in an operation referred to as "tacking."

Peeling content from the portable computer 104 to the mobile device 102 may include using an application that resides on the mobile device 102 to communicate with an application that resides on the portable computer 104. The user at the mobile device 102 may request a copy of one or more pieces of content displayed on the front-facing screen of the portable computer 104. The user at the portable computer 104 may receive a notification that someone is requesting content and optionally permit the user of the mobile device 102 to "peel" the content from the presentation. In an embodiment, peeling content constitutes taking a copy of the content. In another embodiment, peeling content constitutes cutting the content out of the presentation and obtaining the content at an electronic device.

The user that just peeled content may opt to post the content on his device (e.g., personal broadcast). An application, which may be the same application used to request the content, may be used to organize a presentation on a front-facing screen. Organizing the content may include various operations such as cropping, resizing, adding or changing colors, use of various photo effects (e.g., blur, black and white, or other filters), or otherwise arranging the layout of the content.

Tacking content to the portable computer 104 may include using an application to transmit content to the portable computer 104. A user at the portable computer 104 may receive a notification alerting the user of content that a person or entity wants to post on the front-facing screen of the portable computer 104. The content may originate from a user (e.g., a friend) that wants to post content. For example, after a night out with a group of friends, one friend may broadcast a photo of the group to the other people in the group with the intent of posting (tacking) the photo to each person's screen.

Alternatively or additionally, the content may originate from an entity, such as a business or government entity. For example, when a user enters a bookstore, a server associated with the bookstore may detect the user's device and transmit a request to post an advertisement to the user's screen. In an embodiment, the user is compensated for allowing the bookstore to post the advertisement, such as with a coupon to the coffee stand in the bookstore. Other types of messages may be pushed to the user's device without requesting permission from the user, such as with an Amber alert.

A user may configure preferences, filters, or other controls to manage content providers or content requests. For example, user preferences may be stored (e.g., at the portable computer 104 or in the cloud on a server 106). User preferences may be set actively by a user or may be set passively, such as by a user's behavior or other historic data. The user preferences may include a user's identification, a user's residential address, a user's history of residential addresses, a user's age or birthdate, a user's marital status or relationship history, a user's employment status or employment history, and the like. Additionally, the user preferences may include historical purchases or product inquires (e.g., web search results for various products). User data may be obtained from a user's personal device via emails, notes, shopping lists, calendar entries, web searches, web browsing and history, phone calls, photos, historical device location and use, and other aspects available directly or deduced from information on the personal device. In an embodiment, a user may actively control which information is discoverable or available for use, or how discovered or identified information is used.

User preferences and data policies may be defined by a user or a group of users. For example, policies may be crowd sourced where communities define a policy and offer it to users. The crowd sourced policy may be offered for a fee or for free. A user may download the crowd sourced policy and install it so that it will be used on data feeds or other content pushed to the user's device.

For example, Ben likes SuperCoffee coffee brand. Ben may have set a preference for such an affinity, or Ben may have allowed an application to track purchases evidencing the affinity. When Ben enters a SuperCoffee shop, the local SuperCoffee server identifies Ben's Ultrabook® and pushes a message to Ben's personal bulletin board (e.g., the presentation on the front-facing screen). Based on Ben's preferences, the SuperCoffee message is posted without expressly requesting permission from Ben.

In another example, Ben enters a public library for the first time. Ben's device may be detected by a content server at the library. The content server may determine that Ben is new to the system and transmit a policy to Ben for approval. The policy may include an option for Ben to trust all content originating from the library's server and an option for Ben to decline the policy. The policy may include other aspects, such as allowing/denying certain types of content, such as advertisement, coupons, informational messages, partner messages, and the like.

In an embodiment, the system 100 includes an electronic display 110. The electronic display 110 may be provided by a business or governmental entity where the users are patrons. Optionally, the electronic display 110 may be provided by an entity that manages or provides a network service (e.g., cloud service provider). The electronic display 110 may take various forms, such as a LCD (liquid crystal display), LED (light emitting diode), plasma displays, or projected images to display content. The electronic display 110 may act as another electronic bulletin board to display messages posted by patrons, business owners, advertisers, or the like. The messages may include promotions or other information about the store. Users may peel messages from the electronic display 110 in a similar manner to peeling content in a user-to-user context. A user may identify the available "peel-able" content in an application running on the user's device (e.g., a portable computer 104). The user may execute a command to peel the content from the electronic display 110 and post the content to the user's own screen (e.g., a front-facing screen on the portable computer 104).

In an embodiment, the system 100 includes a virtual display 112. The virtual display 112 may be provided by a business or governmental entity, similar to that of the electronic display 110. The virtual display 112 acts as a bulletin board, but instead of displaying it to the public on a physical device, the virtual display 112 is accessible by one or more users who are at or near a particular location. Operations such as peeling and taking are available on a virtual display 112 much in the same way as that for an electronic display 110. Policies and policy management may be similar as well.

In some embodiments, content is controlled by one or more policies. For example, in the context of a public e-bulletin board, content may be tagged as "read-only" such that a user may view the content on the electronic display 110 or within an application on the user's device (e.g., portable computer 104), but may not be able to peel the content from the electronic display 110. Read-only content may be protected by encryption (e.g., with a security certificate) to indicate and ensure its authenticity. Read-only content may be content that the original author wants to protect, such as copyrighted content. Other content policies may exist, such as only allowing a certain number of peels or tacks, or only allowing a certain user or class of users to peel or tack the content.

For example, after visiting SuperCoffee, Ben realizes that he has a coupon for a cup of coffee that expires today. He is unlikely to use it, so he decided to leave it for another person to use. Ben tacks the coupon to SuperCoffee's public bulletin board (e.g., on the electronic display 110), with the policy that it is only peel-able once and it is peel-able by anyone.

In another example, Ben may have a coupon for a free cookie at the SuperCoffee. Instead of tacking the coupon as being available to anyone, Ben tacks the coupon to the electronic display 110 with the policy that only a person who is age twelve or under is allowed to peel the coupon.

Other examples of using the electronic display 110 may be a direct user-to-user communication. For example, Ben may be expecting his friend James. Ben arrives at the SuperCoffee first, but then remembers that he left some items in his car. Instead of texting or calling James, Ben may create a message and tack it to the SuperCoffee bulletin board (e.g., electronic display 110), with the policy that it expires in 10 minutes (roughly the time needed for Ben to hurry to his car and back), and that only James may peel the message. An envelope graphic with the name "James" may appear on the electronic display 110 to prompt James to look at his own device and peel the message from the electronic display 110. It is understood that the user-to-user messaging may be extended to one-to-many users. For example, Ben may be waiting for a group of friends and may leave a similar message with policies to direct the message only to members of the group.

Figure 2:
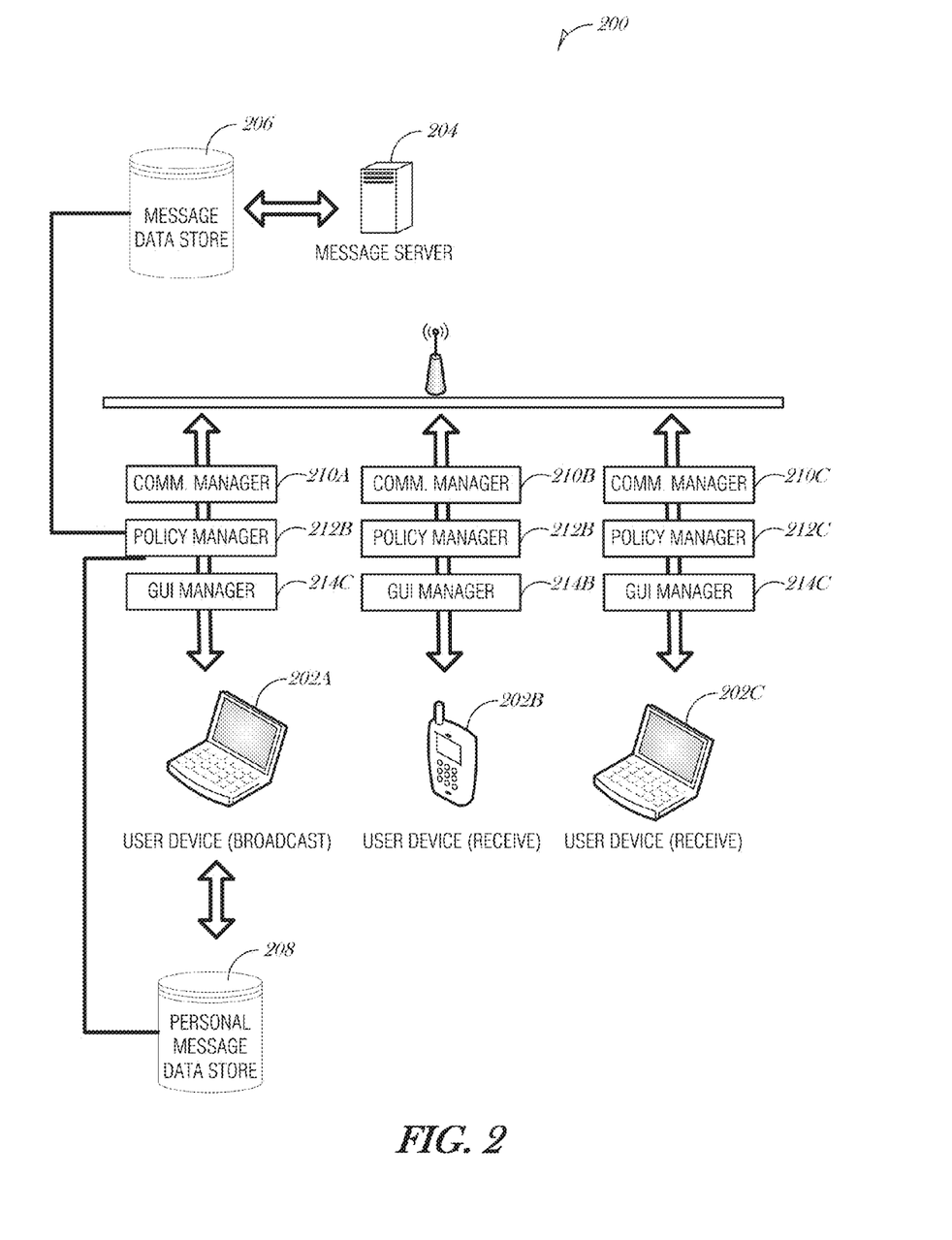
FIG. 2 is a schematic diagram illustrating functional components of a content sharing system, according to an embodiment.

FIG. 2 is a schematic diagram illustrating functional components of a content sharing system 200, according to an embodiment. The content sharing system includes three user devices 202A, 202B, 202C. Although three user devices are illustrated, it is understood that more or fewer may exist in an ad hoc network topology at any given time. In addition, the system 200 includes a message server 204. The message server 204 may access a message data store 206. A broadcasting user device 202A may access a personal message data store 208. The personal message data store 208 may be stored at the user device 202A or in a network storage (e.g., in a cloud service).

The system 200 includes a broadcaster (e.g., user device 202A) and one or more viewer devices (e.g., user device 202B and 202C). A broadcaster may also be a receiver to other messages broadcasted in proximity Broadcasting may also be performed via a public screen (e.g., electronic display 110) with or without a representation existing on the local screen (e.g., front-facing screen of user device 202A). In other words, a user may choose to broadcast the content solely by means of the public display. Such public broadcasting may be subject to content policies.

The general architecture as presented in FIG. 2 includes three main blocks: a communication manager 210, a policy manager 212, and a graphical user interface (GUI) manager 214. Each user device 202A, 202B, and 202C include such functional blocks.

The communication manager 210 is configured to provide underlying physical connections to nearby machines. Communication may be provided by cellular communication, Bluetooth™, Wi-Fi®, radio-frequency identification (RFID), WiMAX®, and the like. The communication manager 210 may also be configured to limit the number, type, or identity of machines it communicates with based on one or more policies. The communication manager 210 is configured to detect machines in proximity. In the case of ambiguous data where some machines may be nearby, but appear to be closer due to GPS inaccuracies, such ambiguities may be resolved by user input or other near field technologies, such as geo-fencing.

The policy manager 212 manages user-created policies. Policies may be used to control content from either the content perspective or the presentation perspective. From the content perspective, content policies may be used to control who may view, peel, or tack the content; when actions may be used on the content (e.g., an expiration date); and where content may be viewed, peeled, or tacked. From the presentation perspective, policies may be used to determine if and when content may be posted to the user's front-facing screen, who may tack or peel content, how content may be used or modified after peeling (e.g., digital rights management), and the like. Policies may also be used to define whitelists and blacklists, a list of content providers that are always allowed to post on a user's bulletin board and a list of content providers that are never allowed to post a user's bulletin board, respectively. Policies may be crowd sources where communities define them and offer them free or for a fee. While not shown in FIG. 2, a business may use a policy manager 212 to manage content for a public display (e.g., electronic display 110).

The GUI manager 214 provide an interface for a user to view content being displayed in the local vicinity. The user may then interact with the content or the content providers, to request a peel or request to tack onto nearby devices. The GUI manager 214 may also act as the interface to the policy manager 212 to manage user preferences regarding content.

Content may include metadata. The metadata may be transmitted with the content in an organized message structure. Metadata may include the author, expiry or other time information, one or more recipients, and policy information. Optionally, metadata may include a proxy identity. The author information may be anonymized or semi-anonymized by including information about the user, but withholding the full identity, e.g., first name only. The expiry and time information may include a timeframe during which the message is active (e.g., broadcasted). Recipient information may identify a specific user or a group of users that the broadcasted message is destined for. The policy information may include digital rights concerning the content, such as the right to forward, peel, share, pin, change, reply, or tack the content. Policies may be defined for specific users, groups, or globally. The optional proxy identity allows a user to submit a full identification to another user or entity, but then a proxy identity is used when the content is posted for display. Thus the user is anonymous or partially anonymous to the public, but known to the person or entity that posts the content.

The content and metadata may be transmitted in a structured message format. The message format may include a header block with the metadata and a body block with the content. Content may be various types of digital content, such as messages, video, images, and other multimedia. The message may be encrypted so that only the recipients may unencrypt it. The recipient may unlock or unencrypt the message based on their identity or a set of actions that they are required to perform. For example, an author may set a security protocol on a message such that a recipient may have to go to a place or perform an act, then provide proof that they performed the required act before unlocking the message. Additionally, the message may hide some functionality before it is unlocked. For example, a message may include links to additional information or have the ability to initiate an email after being unlocked.

Figure 3:
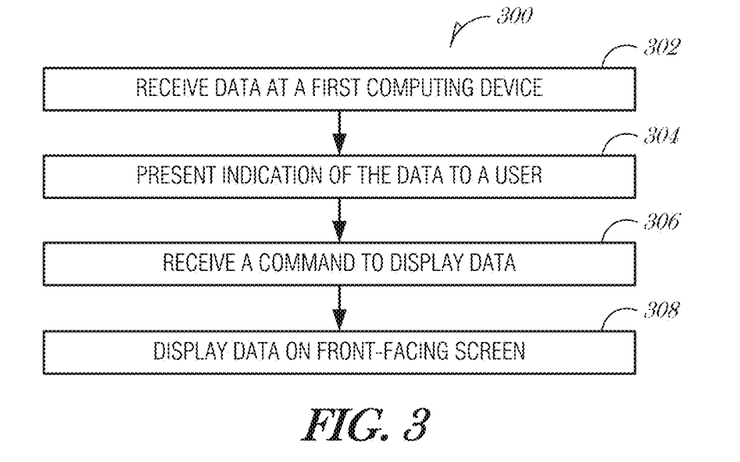
FIG. 3 is a flowchart illustrating a method for displaying a personal bulletin board on a computer display, according to an embodiment.

FIG. 3 is a flowchart illustrating a method 300 for displaying a personal bulletin board on a computer display, according to an embodiment. At 302, data is received at a first computing device from a second computing device, where the first computing device including a rear-facing screen and a front-facing screen. In an embodiment, the second computing device comprises a server and the method 300 comprises connecting with the server, the server being associated with a business and receiving data related to the business. In an embodiment, connecting with the server is contingent on the first computing device operating in proximity to the business. For example, a business may geofence their property to restrict access to the server based on the user's device's location.

At 304, an indication of the data is presented to a user of the first computing device. In an embodiment, at least one of: an author of the data, a source of the data, a description of the data, a video preview of the data, or a thumbnail image of the data is presented.

At 306, a command is received from the user to display a representation of the data on the front-facing screen.

At 308, the representation of the data is displayed on the front-facing screen.

In a further embodiment, the method 300 comprises accessing a policy store to determine whether the data received from the second computing device is approved for display and conditionally presenting the indication of the data to the user of the first computer based on the determination. In an embodiment, the user manages the policy store. In an embodiment, the policy store is managed by crowd sourcing.

In a further embodiment, the second computing device includes a second front-facing screen and the method 300 comprises presenting on the rear-facing screen of the first computing device, content that is presented on the second front-facing screen. The method 300 also includes receiving a command from the user to capture the content presented on the second front-facing screen and presenting the captured content on the front-facing screen of the first computing device.

In a further embodiment, the method 300 comprises transmitting a request to the second computing device for permission to capture the content presented on the second front-facing screen, receiving permission from the second computing device, and capturing content from the second computing device based on the permission.

Figure 4:
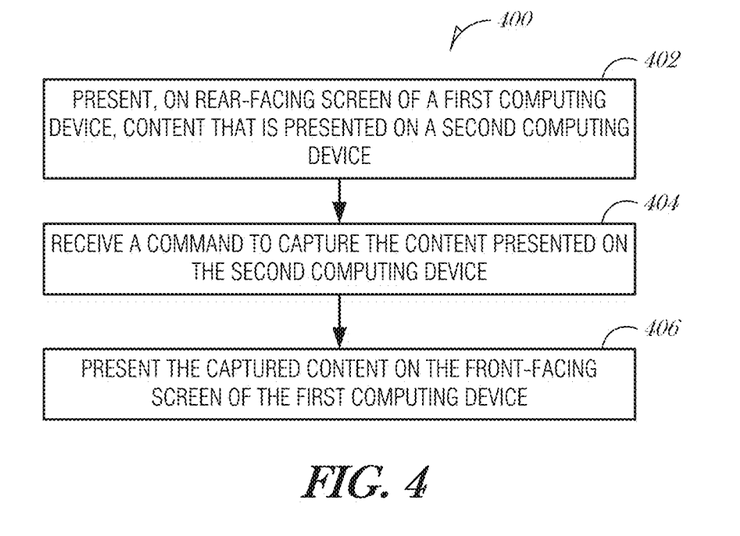
FIG. 4 is a flowchart illustrating a method for displaying a personal bulletin board on a computer display, according to an embodiment.

FIG. 4 is a flowchart illustrating a method 400 for displaying a personal bulletin board on a computer display, according to an embodiment. At 402, presenting on a rear-facing screen of a first computing device content that is presented on a second computing device, the second computing device including a second rear-facing screen and a second front-facing screen.

At 404, a command is received from the user of the first computing device to capture the content presented on the second front-facing screen of the second computing device.

At 406, the captured content is presented on the front-facing screen of the first computing device.

In a further embodiment, the method 400 includes transmitting a request to the second computing device for permission to capture the content presented on the second front-facing screen; receiving permission from the second computing device; and capturing content from the second computing device based on the permission.

In a further embodiment, the method 400 includes modifying the captured content; and transmitting the captured content to the second computing device, wherein a user of the second computing device may post the transmitted captured content to the second front-facing screen of the second computing device.

In an embodiment, the first computing device comprises a smartphone. In an embodiment, the first computing device including a rear-facing screen and the front-facing screen.

Figure 5:
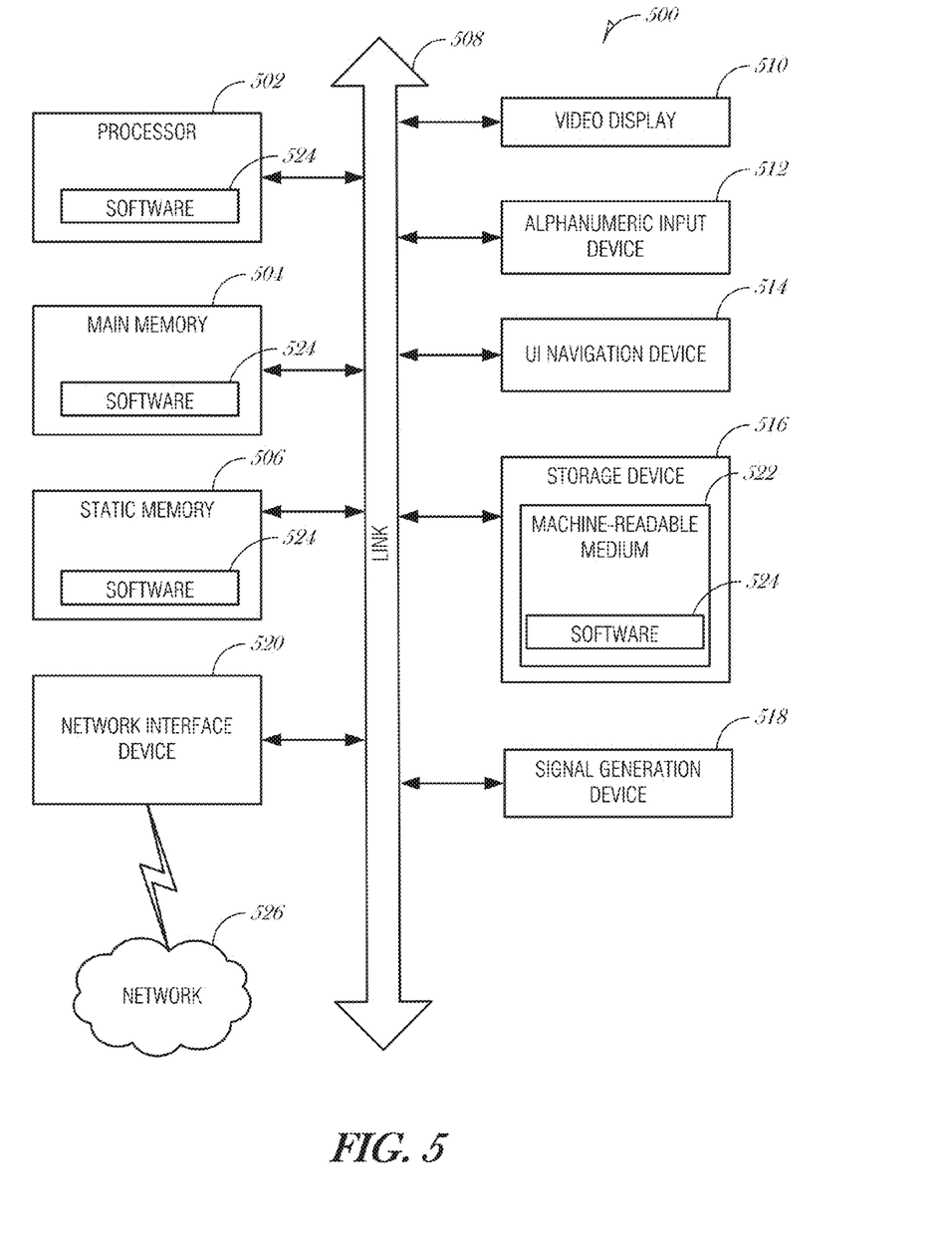
FIG. 5 is a block diagram illustrating an example machine upon which any one or more of the techniques (e.g., methodologies) discussed herein may perform, according to an example embodiment.

FIG. 5 is a block diagram illustrating an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 500 may include a hardware processor 502 (e.g., a central processing unit (CPU), a graphics processing unit (GPU), a hardware processor core, or any combination thereof), a main memory 504, and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse). In an example, the display device 510, input device 512 and UI navigation device 514 may be a touch screen display. The machine 500 may additionally include a mass storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage device 526 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine readable media.

While the machine readable medium 522 is illustrated as a single medium, the term "machine readable medium" may include a single medium or multiple media (e.g., a centralized or distributed database, and/or associated caches and servers) that arranged to store the one or more instructions 524.

The term "machine readable medium" may include any medium that is capable of storing, encoding, or carrying instructions for execution by the machine 800 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES & EXAMPLES

Example 1 includes subject matter (such as a device, apparatus, or user equipment (UE)) comprising a first computing device to display a personal bulletin board, comprising: a transceiver configured to receive data at the first computing device from a second computing device; a rear-facing screen configured to present an indication of the data to a user of the first computing device; an input module configured to receive a command from the user to display a representation of the data on the front-facing screen; and a front-facing screen configured to display the representation of the data in response to receiving the command from the user.

In Example 2, the subject matter of Example 1 may optionally include, wherein the rear-facing screen is further configured to present at least one of: an author of the data, a source of the data, a description of the data, a video preview of the data, or a thumbnail image of the data.

In Example 3 the subject matter of any one or both of Examples 1 and 2 may optionally include, wherein the second computing device comprises a server associated with a business, and wherein the transceiver is configured to: connect with the server; and receive data related to the business.

In Example 4 the subject matter of any one or more of Examples 1 to 3 may optionally include, wherein connecting with the server is contingent on the first computing device operating in proximity to the business.

In Example 5 the subject matter of any one or more of Examples 1 to 4 may optionally include a policy manager to: access a policy store to determine whether the data received from the second computing device is approved for display; and conditionally present the indication of the data on the rear-facing screen to the user based on the determination.

In Example 6 the subject matter of any one or more of Examples 1 to 5 may optionally include, wherein the policy store is configured to be managed by the user.

In Example 7 the subject matter of any one or more of Examples 1 to 6 may optionally include, wherein the policy store is configured to be managed by crowd sourcing.

In Example 8 the subject matter of any one or more of Examples 1 to 7 may optionally include, wherein the second computing device includes a second front-facing screen and wherein: the rear-facing screen is configured to present content that is presented on the second front-facing screen; the input module is configured to receive a command from the user to capture the content presented on the second front-facing screen; and the front-facing screen is configured to present the captured content.

In Example 9 the subject matter of any one or more of Examples 1 to 8 may optionally include, wherein the transceiver is configured to: transmit a request to the second computing device for permission to capture the content presented on the second front-facing screen; receive permission from the second computing device; and capture content from the second computing device based on the permission.

Example 10 includes or may optionally be combined with the subject matter of any one of Examples 1-13 to include subject matter (such as a device, apparatus, or user equipment (UE)) comprising a first computing device for displaying a personal bulletin board, comprising: a rear-facing screen configured to present content that is presented on a second computing device, the second computing device including a second rear-facing screen and a second front-facing screen; an input module configured to receive a command from the user of the first device to capture the content presented on the second front-facing screen of the second computing device; and a front-facing screen configured to present the captured content.

In Example 11, the subject matter of Example 10 may optionally include a transceiver configured to: transmit a request to the second computing device for permission to capture the content presented on the second front-facing screen; receive permission from the second computing device; and capture content from the second computing device based on the permission.

In Example 12 the subject matter of any one or both of Examples 10 and 11 may optionally include a content editor module configured to modify the captured content; and wherein the transceiver is further configured to transmit the captured content to the second computing device, wherein a user of the second computing device may post the transmitted captured content to the second front-facing screen of the second computing device.

In Example 13 the subject matter of any one or more of Examples 10 to 12 may optionally include, wherein the first device comprises a smartphone.

In Example 14 the subject matter of any one or more of Examples 10 to 13 may optionally include, wherein the first device including a rear-facing screen and the front-facing screen.

Example 15 includes or may optionally be combined with the subject matter of any one of Examples 1-14 to include subject matter (such as a method, means for performing acts, machine readable medium including instructions for displaying a personal bulletin board on a computer display that, when performed by a machine cause the machine to performs acts, or an apparatus configured to perform) comprising receiving data at a first computing device from a second computing device, the first computing device including a rear-facing screen and a front-facing screen; presenting an indication of the data to a user of the first computing device; receiving a command from the user to display a representation of the data on the front-facing screen; and displaying the representation of the data on the front-facing screen.

In Example 16, the subject matter of Example 15 may optionally include, wherein presenting the indication of the data to the user comprises: presenting at least one of: an author of the data, a source of the data, a description of the data, a video preview of the data, or a thumbnail image of the data.

In Example 17 the subject matter of any one or more of Examples 15 to 16 may optionally include, wherein the second computing device comprises a server, and wherein receiving data at the first computing device comprises: connecting with the server, the server being associated with a business; and receiving data related to the business.

In Example 18 the subject matter of any one or more of Examples 15 to 17 may optionally include, wherein connecting with the server is contingent on the first computing device operating in proximity to the business.

In Example 19 the subject matter of any one or more of Examples 15 to 18 may optionally include accessing a policy store to determine whether the data received from the second computing device is approved for display; and conditionally presenting the indication of the data to the user of the first computer based on the determination.

In Example 20 the subject matter of any one or more of Examples 15 to 19 may optionally include receiving user input to manage the policy store.

In Example 21 the subject matter of any one or more of Examples 15 to 20 may optionally include receiving crowd sourcing input to manage the policy store.

In Example 22 the subject matter of any one or more of Examples 15 to 21 may optionally include, wherein the second computing device includes a second front-facing screen and wherein the method further comprises: presenting on the rear-facing screen of the first computing device, content that is presented on the second front-facing screen; receiving a command from the user to capture the content presented on the second front-facing screen; and presenting the captured content on the front-facing screen of the first computing device.

In Example 23 the subject matter of any one or more of Examples 15 to 22 may optionally include transmitting a request to the second computing device for permission to capture the content presented on the second front-facing screen; receiving permission from the second computing device; and capturing content from the second computing device based on the permission.

Example 24 includes or may optionally be combined with the subject matter of any one of Examples 1-23 to include subject matter (such as a method, means for performing acts, machine readable medium including instructions that, when performed by a machine cause the machine to performs acts, or an apparatus configured to perform) for displaying a personal bulletin board on a computer display comprising presenting on a rear-facing screen of a first computing device content that is presented on a second computing device, the second computing device including a second rear-facing screen and a second front-facing screen; receiving a command from the user of the first computing device to capture the content presented on the second front-facing screen of the second computing device; and presenting the captured content on the front-facing screen of the first computing device.

In Example 25, the subject matter of Example 24 may optionally include transmitting a request to the second computing device for permission to capture the content presented on the second front-facing screen; receiving permission from the second computing device; and capturing content from the second computing device based on the permission.

In Example 26 the subject matter of any one or more of Examples 24 to 25 may optionally include modifying the captured content; and transmitting the captured content to the second computing device, wherein a user of the second computing device may post the transmitted captured content to the second front-facing screen of the second computing device.

In Example 27 the subject matter of any one or more of Examples 24 to 26 may optionally include, wherein the first computing device comprises a smartphone.

In Example 28 the subject matter of any one or more of Examples 24 to 27 may optionally include, wherein the first computing device including a rear-facing screen and the front-facing screen.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A first computing device for displaying a personal bulletin board, the first computing device comprising:
   a transceiver configured to receive data at the first computing device from a second computing device;
   a policy manager configured to access a policy store to determine whether the data received from the second computing device is approved for display, the policy store including a whitelist, a blacklist, and a peeling policy;
   a rear-facing screen configured to present an indication of the data to a user of the first computing device, the indication including notification that the data is peelable from the personal bulletin board by a prescribed number of users and a certain class of users as specified in whitelist, the blacklist, and the peeling policy;
   an input module configured to receive a command from the user to display a representation of the data on a front-facing screen; and
   the front-facing screen configured to display the representation of the data in response to receiving the command from the user.

2. The device of claim 1, wherein the rear-facing screen is further configured to present at least one of: an author of the data, a source of the data, a description of the data, a video preview of the data, or a thumbnail image of the data.

3. The device of claim 1, wherein the second computing device comprises a server associated with a business, and wherein the transceiver is configured to:
   connect with the server; and
   receive data related to the business.

4. The device of claim 3, wherein connecting with the server is contingent on the first computing device operating in proximity to the business.

5. The device of claim 1, wherein the policy manager conditionally present the indication of the data on the rear-facing screen to the user based on the determination.

6. The device of claim 5, wherein the policy store is configured to be managed by the user.

7. The device of claim 5, wherein the policy store is configured to be managed by crowd sourcing.

8. The device of claim 1, wherein the second computing device includes a second front-facing screen and wherein:

the rear-facing screen is configured to present content that is presented on the second front-facing screen;

the input module is configured to receive a command from the user to capture the content presented on the second front-facing screen; and the front-facing screen is configured to present the captured content.

9. The device of claim 8, wherein the transceiver is configured to:

transmit a request to the second computing device for permission to capture the content presented on the second front-facing screen;

receive permission from the second computing device; and capture content from the second computing device based on the permission.

10. A first computing device for displaying a personal bulletin board, comprising:

a rear-facing screen configured to present content that is presented on a second computing device, the second computing device including a second rear-facing screen and a second front-facing screen, wherein the content is peelable from the second computing device by a prescribed number of users and a certain class of users in accordance with a peeling policy that includes a whitelist and a blacklist;

an input module configured to receive a command from a user of a first device to capture the content presented on the second front-facing screen of the second computing device, wherein the command to capture the content includes peeling the content from the second computing device when the user of the first computing device is one of the prescribed number of users and within the certain class of users; and a front-facing screen configured to present the captured content.

11. The device of claim 10, further comprising a transceiver configured to:

transmit a request to the second computing device for permission to capture the content presented on the second front-facing screen;

receive permission from the second computing device; and capture content from the second computing device based on the permission.

12. The device of claim 11, further comprising:

a content editor module configured to modify the captured content; and wherein the transceiver is further configured to transmit the captured content to the second computing device, wherein a user of the second computing device can post the transmitted captured content to the second front-facing screen of the second computing device.

13. The device of claim 10, wherein the first device comprises a smartphone.

14. The device of claim 10, wherein the first device includes a rear-facing screen and the front-facing screen.

15. A non-transitory machine-readable medium including instructions for displaying a personal bulletin board, which when executed by a first computing device, cause the first computing device to:

receive data at the first computing device from a second computing device, the first computing device including a rear-facing screen and a front-facing screen;

access a policy store to determine whether the data received from the second computing device is approved for display, the policy More including a whitelist a blacklist, and a peeling policy;

present an indication of the data to a user of the first computing device, the indication including notification that the data is peelable from the personal bulletin board by a prescribed number of users and a certain class of users as specified in the whitelist, the blacklist, and the peeling policy;

receive a command from the user to display a representation of the data on the front-facing screen; and display the representation of the data on the front-facing screen.

16. The non-transitory machine-readable medium of claim 15, wherein the instructions to present the indication of the data to the user comprise instructions to:

present at least one of: an author of the data, a source of the data, a description of the data, a video preview of the data, or a thumbnail image of the data.

17. The non-transitory machine-readable medium claim 15, wherein the second computing device comprises a server, and wherein receiving data at the first computing device comprises:

connecting with the server, the server being associated with a business; and receiving data related to the business.

18. The non-transitory machine-readable medium of claim 17 wherein connecting with the server is contingent on the first computing device operating in proximity to the business.

19. The non-transitory machine-readable medium of claim 15, further comprising instructions to conditionally present the indication of the data to the user of the first computing device based on the determination.

20. The non-transitory machine-readable medium of claim 19, wherein the user manages the policy store.

21. The non-transitory machine-readable medium of claim 15, wherein the second computing device includes a second front-facing screen and further comprising instructions to:

present on the rear-facing screen of the first computing device, content that is presented on the second front-facing screen;

receive a command from the user to pture the content presented on the second front-facing screen; and present the captured content on the front-facing screen of the first computing device.

22. The non-transitory machine-readable medium of claim 21, further comprising instructions to:

transmit a request to the second computing device for permission to capture the content presented on the second front-facing screen;

receive permission from the second computing device; and capture content from the second computing device based on the permission.

23. A non-transitory machine-readable medium including instructions for displaying a personal bulletin board on a computer which when executed by a first computing device, cause the first computing device to:

present, on a rear-facing screen of the first computing device, content that is provided from a second computing device, the second computing device including a second rear-facing screen and a second front-facing screen, wherein the content is peelable from the second computing device by a prescribed number of users and a certain class of users in accordance with a peeling policy that includes a whitelist and a blacklist;

receive a command from the user of the first computing device to capture the content presented on the second front-facing screen of the second computing device, wherein the command to capture the content includes peeling the content from the second computing device when the user of the first computing device is one of the prescribed number of users and within the certain class of users; and present the captured content on a front-facing screen of the first computing device.

24. The non-transitory machine-readable medium of claim 23, further comprising instructions to:
transmit a request to the second computing device for permission to capture the content presented on the second front-facing screen;
receive permission from the second computing device; and
capture content from the second computing device based on the permission.

25. The non-transitory machine-readable medium of claim 24, further comprising instructions to:
modify the captured content; and
transmit the captured content to the second computing device, wherein a user of the second computing device can post the transmitted captured content to the second front-facing screen of the second computing device.

* * * * *

UNITED STATES PATENT AND TRADEMARK OFFICE
CERTIFICATE OF CORRECTION

PATENT NO. : 9,679,343 B2  
APPLICATION NO. : 13/991589  
DATED : June 13, 2017  
INVENTOR(S) : Yurdana et al.

Page 1 of 1

It is certified that error appears in the above-identified patent and that said Letters Patent is hereby corrected as shown below:

In the Claims

In Column 14, Line 40, in Claim 1, after "in", insert --the--

In Column 16, Line 1, in Claim 15, delete "More" and insert --store-- therefor

In Column 16, Line 1, in Claim 15, delete "whitelist" and insert --whitelist,-- therefor In Column 16, Line 27, in Claim 18, delete "claim 17" and insert --claim 17,-- therefor In Column 16, Line 43, in Claim 21, delete "pture" and insert --capture-- therefor In Column 16, Line 58, in Claim 23, after "computer", insert --display,--

Signed and Sealed this  
Tenth Day of April, 2018

Andrei Iancu  
*Director of the United States Patent and Trademark Office*